(12) United States Patent
Kenney et al.

(10) Patent No.: US 9,696,030 B2
(45) Date of Patent: Jul. 4, 2017

(54) OXY-COMBUSTION COUPLED FIRING AND RECIRCULATION SYSTEM

(71) Applicant: ALSTOM Technology Ltd, Baden (CH)

(72) Inventors: James R. Kenney, Windsor, CT (US); Armand A. Levasseur, Windsor Locks, CT (US); Paul J. Chapman, Windsor, CT (US); Yen-Ming Chen, Broad Brook, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 394 days.

(21) Appl. No.: 13/751,591

(22) Filed: Jan. 28, 2013

(65) Prior Publication Data

US 2014/0212825 A1    Jul. 31, 2014

(51) Int. Cl.
| | |
|---|---|
| *F23C 5/08* | (2006.01) |
| *F23L 7/00* | (2006.01) |
| *F23L 9/02* | (2006.01) |
| *F23C 9/00* | (2006.01) |

(52) U.S. Cl.
CPC ............... *F23C 5/08* (2013.01); *F23C 5/12* (2013.01); *F23C 9/003* (2013.01); *F23L 7/007* (2013.01); *F23L 9/02* (2013.01); *F23L 2900/07001* (2013.01); *Y02E 20/322* (2013.01); *Y02E 20/344* (2013.01)

(58) Field of Classification Search
CPC ...... F23C 5/08; F23C 5/32; F23C 5/12; F23C 9/003; F23L 7/007; F23L 9/02; Y02E 20/344
USPC ......................................... 431/177
See application file for complete search history.

(56) References Cited

U.S. PATENT DOCUMENTS

| | | | | |
|---|---|---|---|---|
| 2,883,948 | A * | 4/1959 | Seidl .............................. | 431/176 |
| 4,055,334 | A * | 10/1977 | Stephens ....................... | 266/138 |
| 5,146,858 | A * | 9/1992 | Tokuda .................... | F23C 7/02 |
| | | | | 110/261 |
| 5,899,172 | A * | 5/1999 | Dallen ..................... | F23C 7/02 |
| | | | | 110/345 |

(Continued)

FOREIGN PATENT DOCUMENTS

| | | |
|---|---|---|
| CN | 1110880 A | 10/1995 |
| CN | 101598333 A | 12/2009 |

(Continued)

OTHER PUBLICATIONS

Website printout of www.oxy-combustion.com as retrieved on Dec. 17, 2012.

*Primary Examiner* — Avinash Savani
*Assistant Examiner* — Rabeeul Zuberi
(74) *Attorney, Agent, or Firm* — GE Global Operation; Stephen G. Midgley (57) ABSTRACT

A combustion system is provided for an oxy-combustion furnace. The combustion system includes at least one windbox mountable on the oxy-combustion furnace and having at least one main firing location. At least one primary inlet is positioned in the at least one main firing location for conveying fuel and the first oxidant into the oxy-combustion furnace. At least one secondary inlet is positioned in the at least one main firing location for conveying the second oxidant into the oxy-combustion furnace. The at least one secondary inlet is angularly offset from the at least one primary inlet.

5 Claims, 8 Drawing Sheets

(56) References Cited

U.S. PATENT DOCUMENTS

| | | |
|---|---|---|
| 6,202,575 B1 | 3/2001 | Bauver et al. |
| 2009/0320725 A1* | 12/2009 | Kang ................... F23C 5/32 110/207 |
| 2010/0077941 A1 | 4/2010 | D'Agostini |
| 2010/0081099 A1* | 4/2010 | Kloosterman et al. ......... 431/11 |
| 2012/0145052 A1 | 6/2012 | Levasseur et al. |

FOREIGN PATENT DOCUMENTS

| | | | | |
|---|---|---|---|---|
| CN | 102667344 A | | 9/2012 | |
| DE | 471330 C | * | 2/1929 | ................ F23C 5/32 |
| EP | 0022454 | * | 1/1981 | ................ F23C 5/32 |

* cited by examiner

OXY-COMBUSTION COUPLED FIRING AND RECIRCULATION SYSTEM

GOVERNMENT RIGHTS

This invention was made with government support under U.S. Contract No. DE-NT0005290. The U.S. government holds certain rights in this invention.

TECHNICAL FIELD

The present disclosure is generally directed to an oxy-combustion coupled firing and recirculation system and in particular to a tangentially fired oxy-combustion and recirculation system wherein oxygen concentration is selectively enriched.

BACKGROUND

Steam generators, particularly those of the coal fired type, can generate harmful emissions. Recent efforts have focused on oxygen firing (e.g., oxy-combustion) which injects oxygen into a duct that transports flue gas into a fuel supply system (e.g., coal pulverizer system) and/or the steam generator. The oxygen can be supplied from an air separation unit. Due to the elimination of the inherent nitrogen that occurs with air firing, oxygen firing results in an essentially pure carbon dioxide product gas which can be more efficiently sequestered. Most oxygen fired steam generators utilize significant flue gas recirculation in order to moderate furnace temperatures. Gas recirculation at high rates adds considerable cost, complexity, and increases the need for auxiliary power.

Typically oxygen from the air separation unit is mixed with the recycled flue gas streams forming an oxidant stream before entering the steam generator. To match air-firing thermal performance a global oxygen concentration of approximately 28% is required. The oxygen concentration in this global oxidant is higher than typical air due to differences in gas density and heat capacities between air and recycled flue gas. There may be some limits placed on the concentration of oxygen in the oxidant stream. For example, the primary oxidant stream which transports pulverized fuel to the steam generator may be limited to about the 21% oxygen content of air to avoid problems with premature combustion of the fuel. Also oxygen contents much above 21% may require that ducts and other components be made of more expensive, higher grade materials suitable for the higher oxygen content. The duct and component limit is 23.5% for temperatures of 200-900° F., to which the oxidant typically is subject.

SUMMARY

According to aspects illustrated herein a there is provided a combustion system for an oxy-combustion furnace. The combustion system includes at least one windbox mountable on the oxy-combustion furnace and having at least one main firing location. At least one primary inlet is positioned in the at least one main firing location for conveying fuel and a first oxidant into the oxy-combustion furnace. At least one secondary inlet is positioned in the at least one main firing location for conveying a second oxidant into the oxy-combustion furnace. The at least one secondary inlet is angularly offset from the at least one primary inlet.

According to further aspects illustrated herein, there is provided an oxy-combustion system having a tangentially-fired oxy-combustion furnace that defines at least one wall. A fuel source conveys a fuel to the oxy-combustion furnace and an oxidant source generates a first oxidant stream. A primary gas recycle stream is extracted from the flue gas, enriched with oxygen extracted from the first oxidant stream, and passed to the oxy-combustion furnace as a first oxygen-enriched stream. A secondary gas recycle stream is extracted from the flue gas, enriched with oxygen extracted from the first oxidant stream, and passed to the oxy-combustion furnace as a second oxygen-enriched stream. A combustion system is provided for the oxy-combustion furnace. The combustion system includes at least one windbox mountable on the oxy-combustion furnace and having at least one main firing location. At least one primary inlet is positioned in the at least one main firing location for conveying fuel and a first oxidant into the oxy-combustion furnace. At least one secondary inlet is positioned in the at least one main firing location for conveying a second oxidant into the oxy-combustion furnace. The at least one secondary inlet is angularly offset from the at least one primary inlet.

The above described and other features are exemplified by the following figures and in the detailed description

BRIEF DESCRIPTION OF THE DRAWINGS

Referring now to the figures, which are exemplary embodiments, and wherein the like elements are numbered alike.

DETAILED DESCRIPTION

Figure 1:
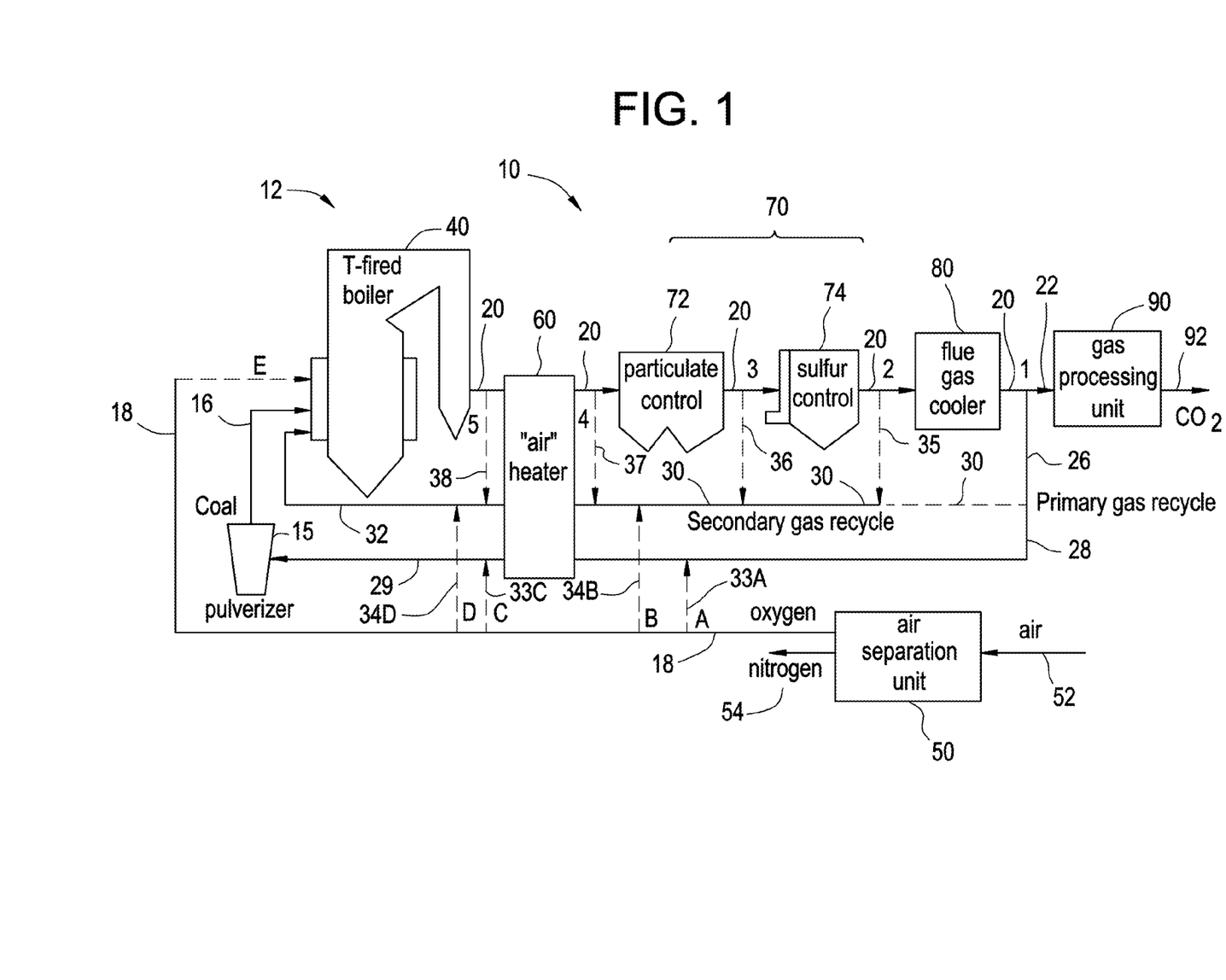
FIG. 1 is a schematic representation of one embodiment of an oxy-combustion coupled firing and recirculation system in accordance with the present invention.

Referring to FIG. 1, an oxy-combustion coupled firing and recirculation system is designated generally by the reference number 10, is hereinafter referred to as an oxy-combustion system 10, and includes an oxy-combustion furnace 12 having a tangential firing system such as a tangentially-fired boiler 40. One embodiment of an electric power generation system comprises the oxy-combustion system 10 having a steam generation portion comprising the tangentially-fired boiler 40.

Oxy-combustion system 10 includes a fuel source 15, and a fuel 16, such as for example pulverized coal, that is passed from the fuel source 15 to the boiler 40. An oxidant source such as an air separation unit 50 extracts oxygen from an incoming air stream 52, or directly from the atmosphere, and emits a stream of nitrogen 54. A first oxidant stream 18 passes oxygen from the air separation unit 50 and into the boiler 40. While the first oxidant stream 18 is shown and described as passing from the air separation unit 50 and into the boiler 40, the present invention is not limited in this regard as the first oxidant stream 18 may be provided by any source of oxygen without departing from the broader aspects of the invention.

Combustion of the fuel 16 with the first oxidant stream 18 in the boiler 40 produces an effluent stream of a flue gas 20. The constituents of the flue gas 20 typically comprise $CO_2$, water vapor and small amounts of $O_2$, $N_2$, and pollutants such as $SO_4$, $NO_x$, and CO. The flue gas 20 passes from the boiler 40 through a first heat exchange unit 60 and subsequently passes through one or more flue gas treatment units. Such flue gas treatment units may include, but is not limited to, one or more units of an Air Quality Control System ("AQCS") 70 for control and/or removal of particulates from the flue gas 20, a flue gas cooler or a second heat exchange unit 80, and a gas processing unit 90. In the embodiment shown in FIG. 1, the AQCS units of the oxy-combustion system 10 include a particulate control unit 72 and a sulfur control unit 74. After passing through the AQCS units, the flue gas 20 is cooled in the second heat exchange unit 80. The flue gas 20 emitted from the second heat exchange unit 80 is passed to the gas processing unit 90 primarily for carbon capture and storage such that a $CO_2$ emission stream 92 is prevented from being released into the atmosphere. Removing water and other components and particulates from the flue gas 20 produces a substantially pure $CO_2$ stream suitable for sequestration or other use.

A recycled flue gas 26 is extracted from the flue gas 20 emitted from the second heat exchange unit 80 and divided into a primary gas recycle stream 28 and a secondary gas recycle stream 30. The primary and secondary gas recycle streams 28 and 30 are heated in the first heat exchange unit 60 by the flue gas 20 received from the boiler 40 and passing therethrough. The primary gas recycle stream 28 is passed from the first heat exchange unit 60, is enriched with oxygen extracted from the first oxidant stream 18 to form a first oxygen-enriched stream 29 and is introduced into the fuel source 15, and is passed to the boiler 40 as a mixture of fuel 16 and a primary oxidant. The secondary gas recycle stream 30 is passed from the first heat exchange unit 60, is enriched with oxygen extracted from the first oxidant stream 18 to form a second oxygen-enriched stream 32, and is passed to the boiler 40 as a secondary oxidant or a second oxidant stream. Accordingly, in the oxy-combustion system 10, typical combustion air (i.e., the first oxidant stream 18) is replaced with the oxygen-enriched streams 29 and 32 (i.e., the oxygen-enriched gas recycle streams 28 and 30). Combustion products comprise a high $CO_2$-content flue gas effluent stream which can be more simply processed for sequestration or high purity product.

Fuel requires a certain amount of oxygen plus some amount of excess oxygen to ensure complete combustion. The amount of oxygen added to the oxygen-enriched stream 32 is based on the amount of fuel 16 fired in the boiler 40. Burning the fuel 16 with the first oxidant stream 18 would produce flame temperatures much too high for practical boiler materials. The secondary gas recycle stream 30, having a high $CO_2$-content, is supplemented with oxygen extracted from the first oxidant stream 18, and the oxygen-enriched stream 32 is provided for combusting the fuel 16 in the boiler 40 thereby moderating the furnace temperature. A portion of the first oxidant stream 18 also may be passed to the boiler 40 if additional oxygen is required for combustion of the fuel 16. The primary gas recycle stream 28 may be selectively enriched with oxygen drawn from the first oxidant stream 18 and injected into the primary gas recycle stream 28 at one or more suitable injection locations such as, for example, via a second and/or a third oxygen stream 33A and 33C, at locations A and C as shown in FIG. 1. The supplemental oxygen added to the oxygen-enriched stream 32 can be drawn from the first oxidant stream 18 and injected into the secondary gas recycle stream 30 at one or more suitable injection locations such as, for example, via a fourth and/or a fifth oxygen stream 34B and 34D, at locations B and D as shown in FIG. 1. While the secondary gas recycle stream 30 is shown and described as being divided from the flue gas 26, along with the primary gas recycle stream 28, at a location 1, the present invention is not limited in this regard as the secondary gas recycle streams 35, 36, 37, and 38 may be divided from the flue gas 20 respectively at locations 2, 3, 4 and/or 5 as shown in FIG. 1, without departing from the broader aspects of the invention.

Figure 2:
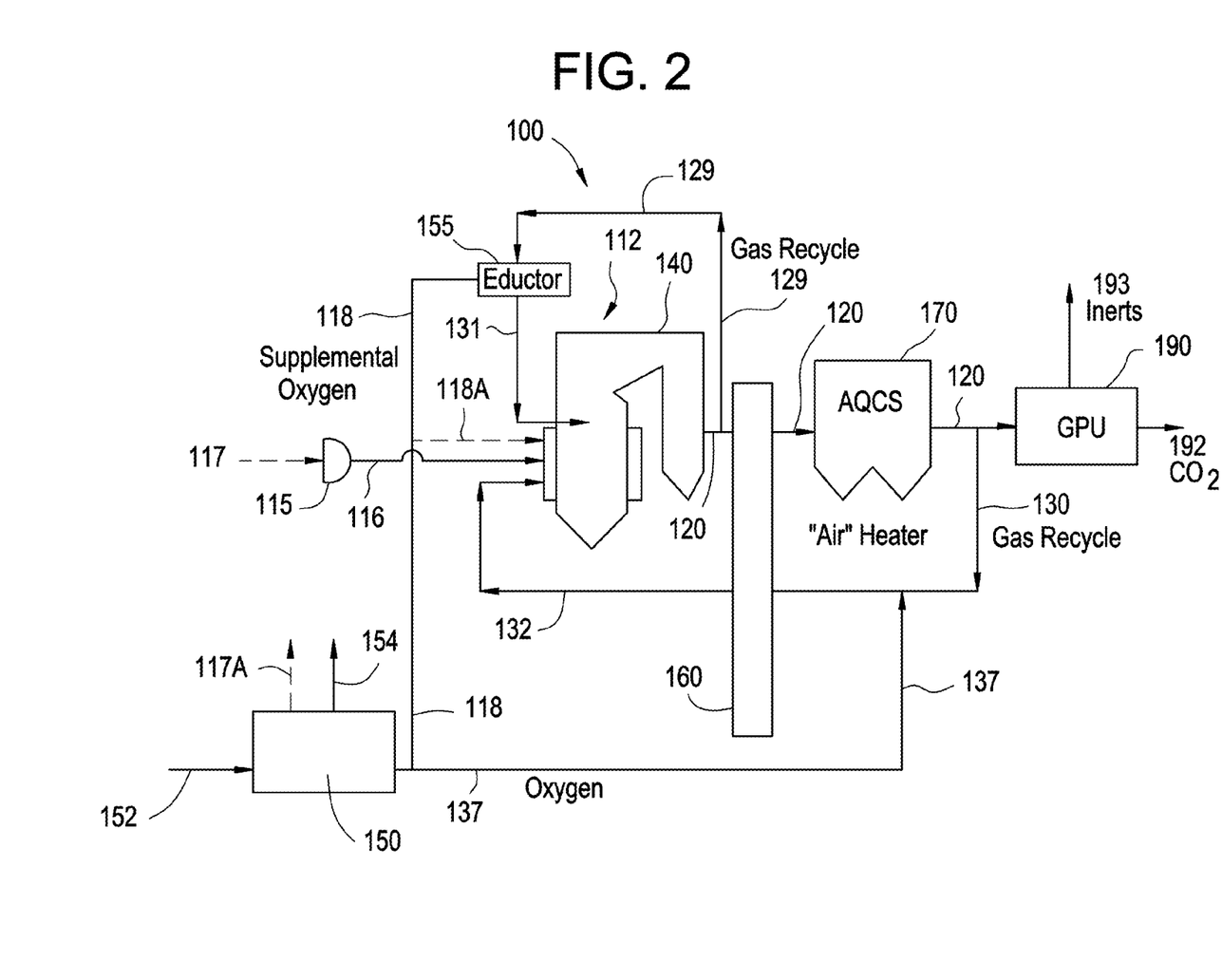
FIG. 2 is a schematic representation of another embodiment of an oxy-combustion coupled firing and recirculation system in accordance with the present invention.

Another embodiment of an oxy-combustion coupled firing and recirculation system is depicted in FIG. 2 and is similar to the oxy-combustion system 10 shown in FIG. 1, thus like elements are given a like element number preceded by the numeral 1.

Referring to FIG. 2, another oxy-combustion coupled firing and recirculation system is designated generally by the reference number 100, is hereinafter referred to as an oxy-combustion system 100, and includes an oxy-combustion furnace 112 having a tangential firing system such as a tangentially-fired boiler 140. A fuel 116 is passed to the boiler 140 from a fuel source 115. An air separation unit 150 extracts oxygen from an incoming air stream 152, or directly from the atmosphere, and emits a first oxidant stream 118, a second oxidant stream 137, and a stream of nitrogen 154. A portion 118A of the first oxidant stream 118 may be passed to the boiler 140 together with the fuel 116. Alternatively a fuel oxidant 117 may be passed to the fuel source 115 and subsequently passed to the boiler 140 together with the fuel 116. The fuel oxidant 117 optionally may be extracted from the first oxidant stream 118, as a third oxidant stream extracted from the air separation unit 150, or obtained from another source of oxygen (not shown). The first oxidant stream 118 passes from the air separation unit 150 and drives an eductor 155. A first oxygen-enriched stream 131 is passed from the eductor 155 to the boiler 140 for combustion of the fuel 116.

The flue gas 120 passes through a first heat exchange unit 160 and subsequently passes through one or more flue gas treatment units. Such flue gas treatment units may include, but is not limited to, one or more units of an AQCS 170 for control and/or removal of particulates from the flue gas 120, and a gas processing unit 190. A first or primary gas recycle stream 129 is extracted from the flue gas 120 and preferably is passed to the eductor 155 wherein it mixes with the first oxidant stream 118 and to produce the first oxygen-enriched stream 131 that is passed from the eductor 155 to the boiler 140. Depending on the arrangement of a power plant, multiple eductors 155 may be utilized and multiple oxygen-enriched streams 131 may be passed into the boiler 140. While the eductor 155 is described as being driven by the first oxidant stream 118, the present invention is not limited in this regard as the eductor 155 may be driven by other flow streams such as, for example, the first gas recycle stream 129 or a premixed fuel/air mixture, without departing from the broader aspects of the invention.

The flue gas 120 emitted from the AQCS units 170 is passed to the gas processing unit 190 primarily for carbon capture and storage such that a $CO_2$ emission stream 192 is prevented from being released into the atmosphere. Inerts 193 also are segregated from the system emission stream. A second gas recycle stream 130 is extracted from the flue gas 120 emitted from the AQCS units 170 and is passed to boiler 140. In one embodiment, a second oxygen-enriched stream 132 is provided for combusting the fuel 116 in the boiler 140 and the second oxygen-enriched stream 132 comprises supplemental oxygen extracted from the second oxidant stream 137 provided by the air separation unit 150 mixed with the second gas recycle stream 130. Accordingly, in the oxy-combustion system 100, typical combustion air is replaced with a mixture of the first and second oxygen-enriched streams 131 and 132. Such a mixture creates a high $CO_2$-content flue gas effluent stream which can be more simply processed for sequestration or high purity product.

There may be some limits placed on the concentration of oxygen in the combustion air or the oxidant streams passed to the boiler 40. For example, oxygen-enriched stream 29 may be limited in oxygen content to a range of about the 21% oxygen content of air to avoid problems with premature combustion of the fuel 16. In combustion systems or boilers having pre-mix gas burners, such premature combustion is commonly referred to as flashback. If the oxygen content of the combustion oxidant passed to the boiler 40 exceeds the range of about the 21% oxygen content of air, the oxy-combustion system 10 may require that one or more ducts and other system components be fabricated from more expensive, higher grade materials suitable for the higher oxygen content. A preferred boiler material design limit of an overall oxygen content of combustion air, or combustion oxidant, is about 23.5% for temperatures relevant to favorable combustion oxidant conditions (e.g., ducts or other system components at an operating temperature range of about 200° F.-900° F.). The design limit of 23.5% defines an oxygen-enriched environment and special precautions must be taken to not burn the metal material of the ducts, windboxes, and other components of the furnace. To maintain similar heat transfer performance to optimal air-fired combustion thermal performance during oxy-fuel combustion wherein combustion air is replaced with one or more of the oxygen-enriched streams, an overall oxidant concentration in the range of about 28% is preferred. The overall oxidant concentration refers to the entire mixture of gases entering the furnace and in practice may not be the concentration of any single stream. At an oxygen concentration of about 28%, the first oxygen stream 18 and the primary gas recycle stream 28 or the first oxygen-enriched stream 29 produce a mixture that has similar heat transfer profiles to air combustion, including similar furnace temperature profiles and gas velocities. As a result, approximately 20% of the stoichiometric oxygen is available as supplemental oxygen to enrich select streams passing into the boiler. Such supplemental oxygen may comprise the oxygen for combustion that must be added separate from the bulk oxidant streams due to material limitations of ductwork and process equipment made of carbon steel.

Figure 3:
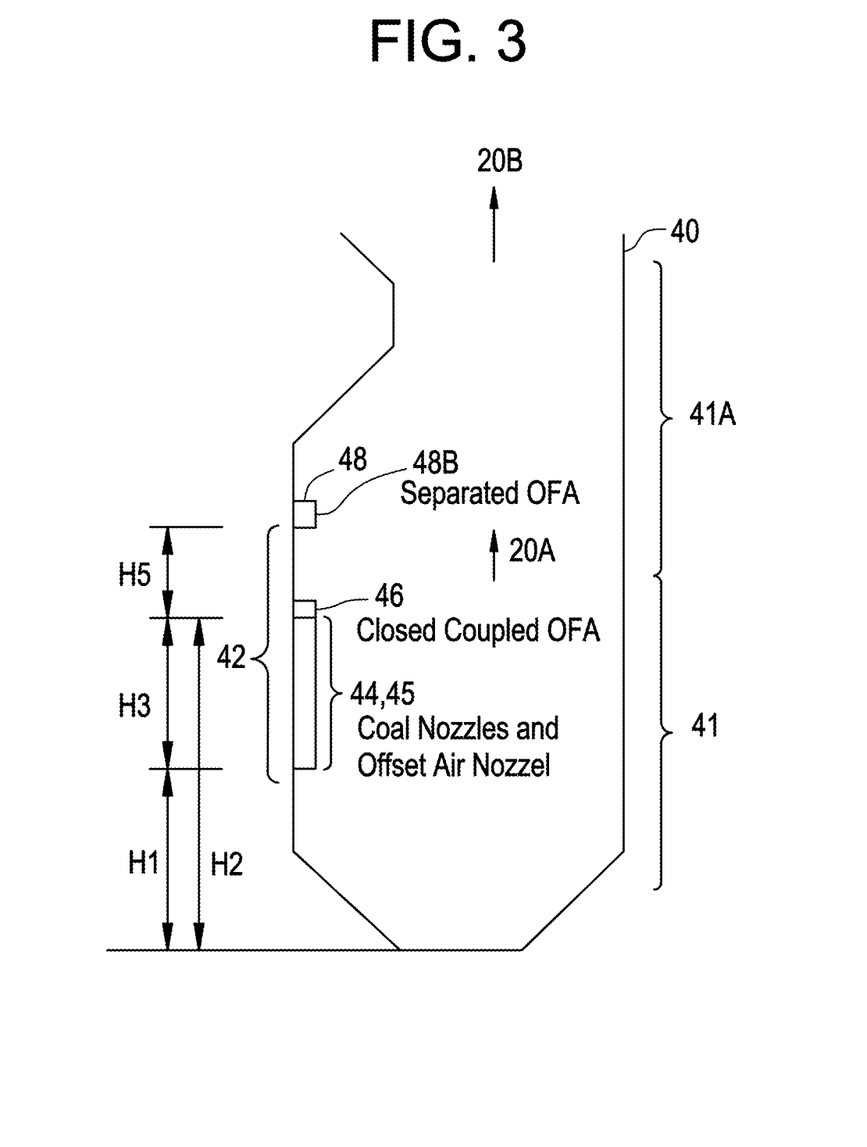
FIG. 3 is a side view of a tangentially-fired combustion system for use in the oxy-combustion coupled firing and recirculation systems of FIG. 1 and FIG. 2.

In one embodiment and as shown in FIG. 3, the boiler 40 comprises an oxy-combustion furnace having a plurality of walls embodying therewithin a combustion region or a combustion chamber 41 in which combustion is sustained by a tangential firing system 42. As further described below with reference to the corresponding figures, the boiler 40 includes at least one windbox 43 mountable thereon that includes at least one main firing location therein. At least one primary inlet, for example a fuel nozzle 44 and/or a primary offset air nozzle 45, is positioned in main firing location for conveying the fuel 16 and an oxidant, for example the primary gas recycle stream 28, into the boiler 40. At least one secondary inlet, for example a secondary offset air nozzle 46, is positioned in the main firing location for conveying an oxidant, for example the secondary gas recycle stream 30, into the boiler 40. The secondary inlet is angularly offset from the primary inlet. At least one over-fire location is positioned downstream of the main firing location and at least one third inlet, for example an over-fire air port 48, is positioned in the over fire location for conveying an oxidant, for example for a separated over-fire air 48A, into the boiler 40. At least one intermediate inlet, for example a mid-wall oxidant port 47A, is laterally offset from the primary inlet and the secondary inlet. The primary inlet and can be positioned diagonally opposite the secondary inlet. The primary inlet and the secondary inlet can be corner inlets.

Each of the primary inlets defines first tangent lines of an inner circle, and each of the at least one secondary inlets defines second tangent lines of second circle wherein the second circle is larger than the inner circle. Each of the intermediate inlets defines third tangent lines of an outer circle, the outer circle being larger than the second circle. The first circle, the second circle, and/or the third circle can be concentric. The primary inlet preferably is positioned at a first injection angle alpha ($\alpha$) relative to a reference plane in the main firing location, and the secondary inlet preferably is positioned at a second injection angle beta ($\beta$) which is offset from the first injection angle alpha ($\alpha$). The primary inlet and the secondary inlet are configured to reduce a portion of a total furnace wall area of the oxy-combustion furnace having a region of high carbon monoxide concentration greater than 6 percent mole fraction proximate the portion of the total furnace wall area to less than 1.5 percent of the total furnace wall area.

Figure 4:
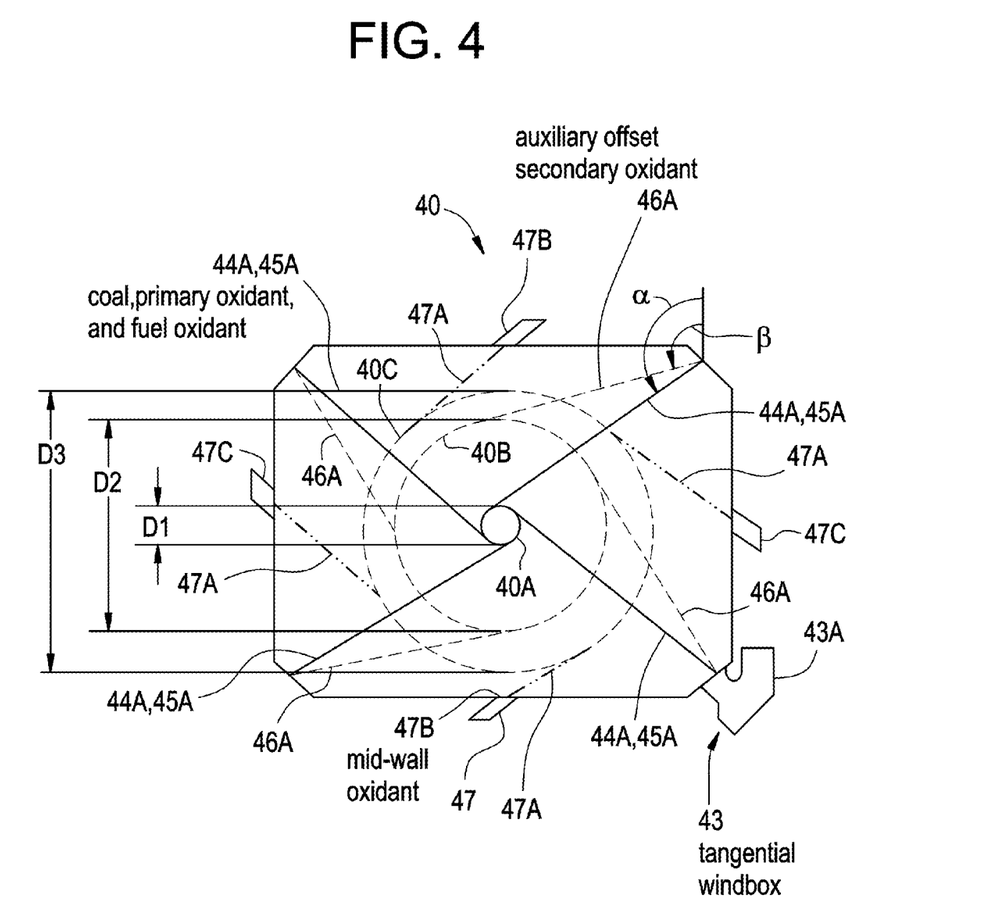
FIG. 4 is a top view of the tangentially-fired combustion system of FIG. 3.

As shown in FIG. 4, the boiler comprises a tangential windbox 43 having one or more tangential channels 43A through which air and/or oxidant streams, typically under pressure, is supplied for combustion of the fuel 16. Although only one tangential channel 43A is shown in FIG. 4, the tangential windbox 43 typically comprises a plurality of such tangential channels 43A surrounding the boiler 40, or surrounding at least the combustion chamber 41 of the boiler 40. For example, a combustion chamber 41 having a substantially vertical and rectangular housing or enclosure typically comprises a tangential windbox 43 having four substantially vertical tangential channels, one positioned at each corner, through which air and/or oxidant streams are supplied for combustion of the fuel 16. Such a fossil fuel-fired combustion system forms the subject matter of U.S. Pat. No. 6,202,575 entitled "Corner Windbox Overfire Air Compartment for a Fossil Fuel-Fired Furnace," issued on May 20, 2001, which is assigned to the same assignee as the present patent application, and which is incorporated herein in its entirety.

Referring to FIG. 3 and FIG. 4, the tangential firing system 42 includes one or more fuel nozzles 44 and one or more primary offset air nozzles 45 that respectively inject a fuel stream 44A and a primary oxidant and/or a fuel oxidant stream 45A through the windbox 43 into the combustion chamber 41 and tangent to a first circle 40A defined within the boiler 40. The tangential firing system 42 also includes one or more secondary offset air nozzles 46 that inject auxiliary offset secondary oxidant 46A through the windbox 43 into the combustion chamber 41 and tangent to a second circle 40B defined within the boiler 40. In addition, the tangential firing system 42 includes one or more mid-wall air nozzles 47 that inject a third oxidant stream, a mid-wall oxidant 47A, into the combustion chamber 41 and tangent to a third circle 40C defined within the boiler 40. In the embodiment shown in FIG. 4, the first circle 40A defines a diameter D1, the second circle 40B defines a diameter D2, and the third circle 40C defines a diameter D3, and wherein D1<D2 and D2<D3.

A concentric firing system ("CFS") is defined by one or more CFS compartments located in the windbox 43 and provides for the offset injection of the auxiliary offset secondary oxidant 46A (tangent to the second circle 40B) from the fuel stream 44A and the primary oxidant and/or a fuel oxidant stream 45A (tangent to the first circle 40A). As shown in FIG. 3, the fuel stream 44A and the primary oxidant and/or a fuel oxidant stream 45A are injected into the combustion chamber 41 generally within a range of height H3 defined by the height between height H1 and height H2. The auxiliary offset secondary oxidant 46A is injected through one or more close-coupled over-fire air ("CCOFA") compartments 46 formed in the tangential windbox 43. The CCOFA compartments 46 are located in the tangential windbox 43 above the top elevation H2 at which the fuel stream 44A and the primary oxidant and/or a fuel oxidant stream 45A are injected into the combustion chamber 41.

As shown in FIG. 4, the fuel stream 44A and the primary oxidant and/or a fuel oxidant stream 45A are injected at a first injection angle alpha ($\alpha$) into the combustion chamber 41. The auxiliary offset secondary oxidant 46A is injected through the CFS compartments located in the tangential windbox 43 at a second injection angle beta ($\beta$) which is offset from the first injection angle alpha ($\alpha$). The offset between the first and second injection angles alpha ($\alpha$) and beta ($\beta$) creates a more oxidizing, less reducing environment along the furnace walls while maintaining the overall reducing environment in the lower portion of furnace. The oxygen enrichment of the auxiliary offset secondary oxidant enhances the impacts on the oxidizing/reducing environment in the furnace while not disrupting flow patterns and mixing. The injection of the oxygen-enriched auxiliary offset secondary oxidant into the boiler at the second injection angle, and at a particular velocity and distance similarly offset from the injection velocity and distance of the fuel stream 44A and the primary oxidant and/or a fuel oxidant stream 45A, creates a more oxidizing and less reducing environment along the furnace walls and thereby reduces corrosion along the furnace walls. Moreover, the additional oxygen used to enrich the auxiliary offset secondary oxidant can power an eductor that will mix the oxygen and flue gas streams and provide for a higher-momentum stream entering the boiler.

The mid-wall oxidant 47A comprises an oxygen-enriched stream, such as a portion of the oxygen-enriched stream 32 or 132, and is injected into the combustion chamber 41 through mid-wall air nozzles 47 at a respective mid-wall oxidant port 47B located between firing corners of the combustion chamber 41. The flow path of the streams of the mid-wall oxidant 47A does pass through the tangential windbox 43 and requires the installation of new penetrations into the furnace or the combustion chamber 41. In one embodiment, a first pair of mid-wall oxidant ports 47B, preferably formed in a first pair of opposing walls of the combustion chamber 41, is located within the range of height H3 at which the fuel stream 44A and the primary oxidant and/or a fuel oxidant stream 45A are injected into the combustion chamber 41. A corresponding second pair of mid-wall oxidant ports 47B, preferably formed in a second pair of opposing walls of the combustion chamber 41, is located at or above the elevation of the CCOFA compartments 46. The four mid-wall oxidant ports 47B can be used independently or in any combination. The mid-wall oxidant 47A can comprise pure oxygen, streams enriched in oxygen by mixing supplemental oxygen with secondary oxidant, or streams enriched in oxygen by mixing supplemental oxygen with a flue gas recycle stream as described above with reference to oxygen-enriched streams 32 and 132. Mixing of the mid-wall oxidant 47A can be provided by any one of a number of mixing means, such as for example diffusers, lances, or eductors.

An oxy-combustion system 10, 100 can be provided for new and retrofit oxy-fired pulverized fuel-fired utility and industrial boilers. The oxy-combustion system 10, 100 provides for reduced corrosion of the furnace components because gas species in the combustion gas adjacent to the furnace walls in the lower furnace are a less corrosive nature relative to traditional oxy-fuel firing. The enhanced furnace mixing within the oxy-combustion system 10, 100 provides for more efficient furnace combustion. The oxy-combustion system 10, 100 also provides for reduce emissions of $NO_x$ and lower parasitic power consumption by utilizing oxygen-driven eductors.

Referring again to FIG. 3 and FIG. 4, there are at least four locations within the boiler 40 of the oxy-combustion system 10 identified as suitable injection locations for the oxygen-enriched stream 32 or 132. The locations can be utilized either separately or in any combination depending on the firing system, process configuration, and fuel. The four locations include but are not limited to: (i) the auxiliary offset secondary oxidant 46A that is injected through the CFS compartments located in the tangential windbox 43 at a second injection angle beta ($\beta$) which is offset from the first injection angle alpha ($\alpha$) (FIG. 4); (ii) the auxiliary offset secondary oxidant 46A that is injected through the CCOFA compartments 46 formed in the tangential windbox 43 and located above the combustion chamber 41 (FIG. 3); (iii) the mid-wall oxidant 47A that is injected through the mid-wall oxidant ports 47B located between firing corners of the combustion chamber 41 (FIG. 4); and (iv) the mid-wall oxidant 47A that is injected through the mid-wall oxidant ports 47C located between firing corners of the combustion chamber 41 (FIG. 4).

Referring to FIG. 3, the boiler selected for use within the oxy-combustion system 10 comprises one or more burners (not shown) located in a lower furnace or combustion chamber 41. Waterwall tubes (not shown) line the inside of the boiler 40 and water contained therein is converted to high pressure steam which is ultimately used to rotate a turbine (not shown). The boiler 40 comprises an over-fire air ("OFA") port 48 located at an elevation exceeding the elevation of the CCOFA compartments 46 by a height of about H5. A flue gas 20A resulting from the combustion of the fuel injected by the fuel nozzles 44 flows upward from the combustion chamber 41 to the upper furnace 41A where separated OFA 48A is injected through the OFA port 48 to complete the combustion process. A flue gas 20B then exits the boiler 40 as described above with reference to FIG. 1.

The side of the waterwall tubes facing the combustion chamber 41, known as the "fire side," exhibits corrosion when incomplete fuel combustion occurs, particularly in coal-fired boilers such as the boiler 40. Such waterwall fire side corrosion is frequently found in the windbox 43 or in the combustion chamber 41. The presence of some products of complete and incomplete combustion, in particular sulfur and chlorine-containing gas species in reducing environments, contributes to waterwall corrosion and wastage, decreasing the useful life of the oxy-combustion system 10. Increasing the concentration of oxygen along the furnace walls in the combustion chamber 41 by injecting the auxiliary offset secondary air 46A tangentially through the CFS compartments or the CCOFA compartments located in the windbox results in cleaner furnace walls and decreases the impacts of slagging and corrosion in the waterwall tubes. The use of the auxiliary offset secondary air 46A also creates a locally reducing environment to minimize NOx formation potential. These advantages are further enhanced by injecting the mid-wall oxidant 47A into the combustion chamber 41 through the mid-wall oxidant ports 47B located between firing corners of the combustion chamber 41.

The constituents of a flue gas 20 typically comprise $CO_2$, water vapor and small amounts of $O_2$, $N_2$, and pollutants such as $SO_4$, $NO_x$, CO and chlorine. In oxy-fuel combustion, the concentrations of these gas species are increased relative to air-fired combustion. In many oxy-fuel combustion systems, the recycled flue gas is used along with a stream of nearly pure oxygen as the oxidant for the combustion system. If the flue gas is untreated prior to return to the boiler, the concentration of all species, including sulfur and chlorine containing gas species, will build up as the result of recycle. A lower volumetric oxidant flow is needed in oxy-combustion systems relative to air-fired combustion to match the thermal performance because of the higher heat capacity and molecular weight of the oxidant relative to air; however, the lower volumetric oxidant flow increases the composition of the sulfur and chlorine containing species in the flue gas stream. For fuels high in sulfur or other corrosive impurities, the oxy-combustion system configuration preferably includes the AQCS units for removing sulfur and other corrosive gas species pre-cursors before recirculation of the oxidant back to the furnace. The use of the AQCS units to treat the entire flue gas stream reduces corrosion risk in an oxy-fuel system; however, such treatment of the flue gas streams will result in higher equipment, capital, and operating costs.

Figure 5:
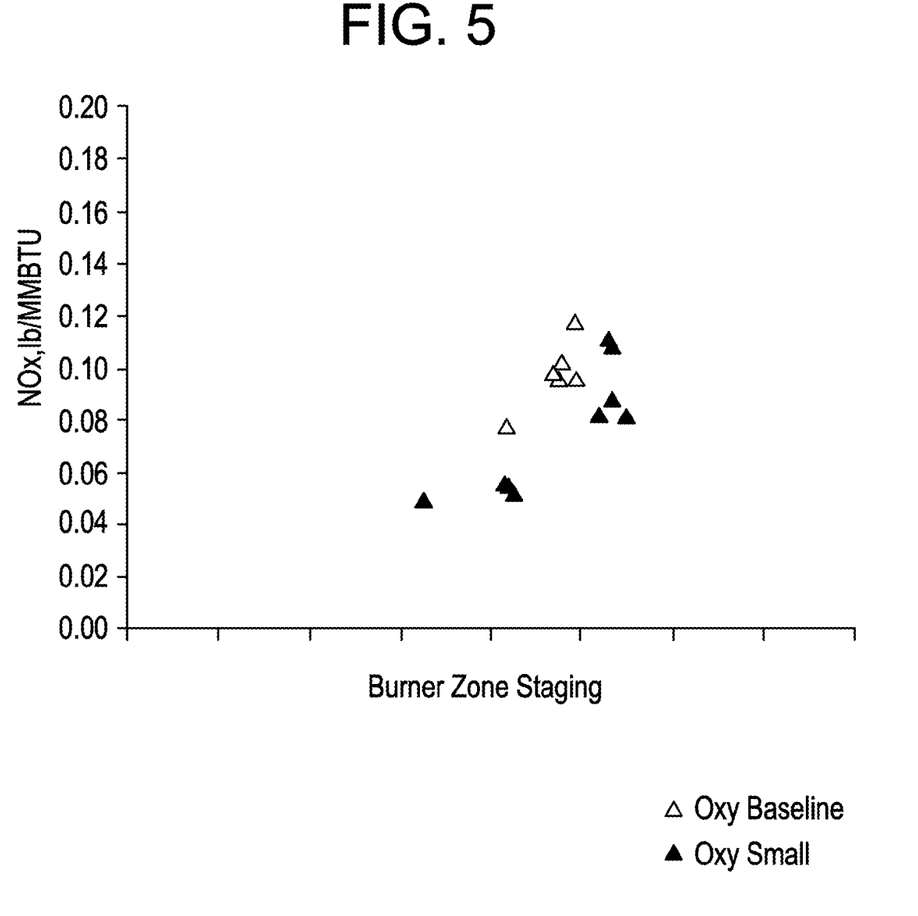
FIG. 5 is a graphical representation of $NO_x$ emissions in relation to burner zone staging.

Computational fluid dynamic ("CFD") modeling, as well as 15 MWth pilot testing, verify that the enriched oxygen injection strategies create a more oxidizing, less reducing gas environment along the furnace walls relative to enrichment of the bulk secondary oxidant. Pilot testing has further verified that such injection strategies reduce furnace NOx emissions. A plot of furnace NOx emissions versus burner zone staging for tests conducted during 15 MWth pilot testing is provided in FIG. 5. Burner zone staging is the stoichiometric ratio of oxygen available in the oxidant for fuel combustion relative to the oxygen required for complete combustion of the fuel in the burner zone, H2 of FIG. 3. At a constant total oxygen input to the boiler, as more oxygen is shifted to the over-fire locations, the burner zone stoichiometry decreases. Burner zone stoichiometry has a strong relationship to NOx emissions. The results plotted in FIG. 5 indicate that the enrichment of the bulk secondary oxidant provides a reduction in furnace NOx emissions of about 20 to about 30% relative to a baseline oxy-combustion at similar burner zone staging.

Figure 6A:
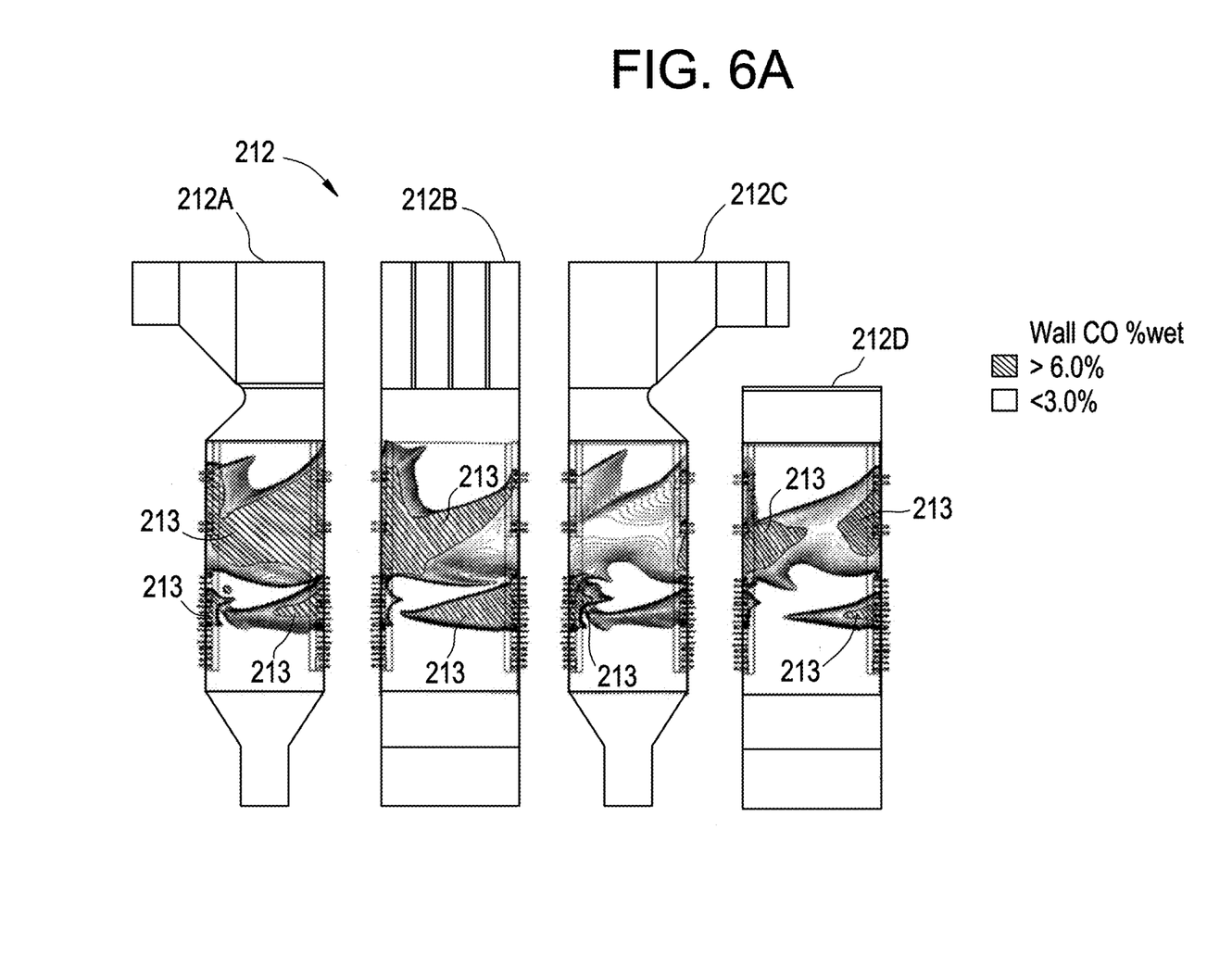
FIG. 6A provides the results of computational fluid dynamic modeling showing furnace wall CO concentrations for baseline oxy-combustion prior to optimization in accordance with an injections strategy of the present invention.
Figure 6B:
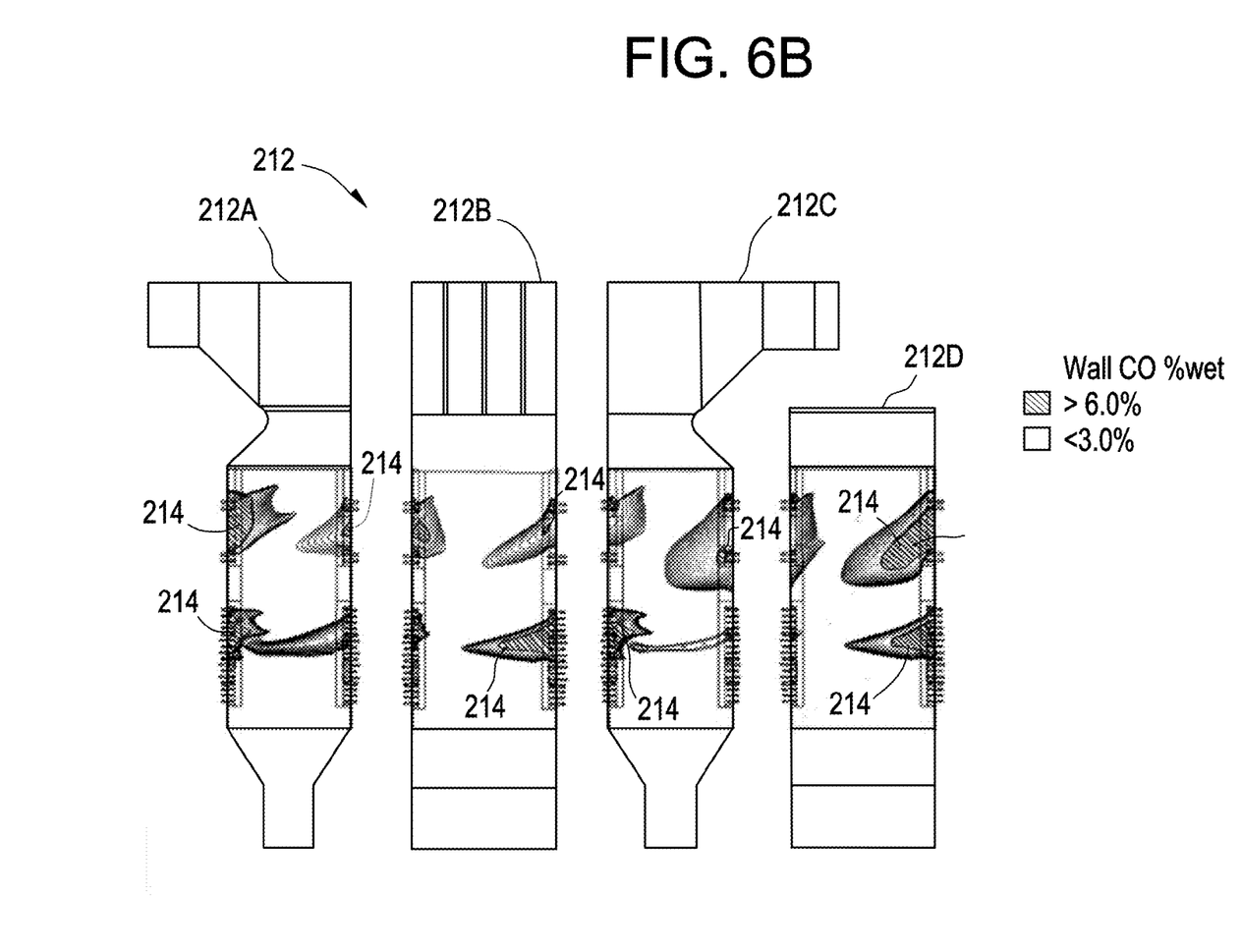
FIG. 6B provides the results of computational fluid dynamic modeling showing furnace wall CO concentrations for baseline oxy-combustion as optimized in accordance with an injections strategy of the present invention FIG. 7 provides the resulting measurements obtained using the same baseline and injection strategies shown in FIGS. 6A and 6B, respectively.

The results of CFD modeling are presented in FIGS. 6A and 6B. The furnace wall CO concentrations for baseline oxy-combustion with enrichment of the bulk secondary oxidant are shown in FIG. 6A. Selective injection strategies combining injection locations for the oxygen-enriched bulk secondary oxidant are shown in FIG. 6B. The selected locations combined include, as identified above: (i) the auxiliary offset secondary oxidant 46A that is injected through the CFS compartments located in the tangential windbox 43 at a second injection angle beta ($\beta$) which is offset from the first injection angle alpha ($\alpha$) (FIG. 4); and (iv) the mid-wall oxidant 47A that is injected through the mid-wall oxidant ports 47C located between firing corners of the combustion chamber 41 (FIG. 4).

As shown in FIGS. 6A and 6B, an oxy-combustion furnace 212 defines a first wall portion 212A (for example, one side wall), a second wall portion 212B (for example, a front wall), a third wall portion 212CA (for example, another side wall), and a fourth wall portion 212D (for example, a back wall). The images depicted on each of the wall portions 212A-212D represent a concentration of carbon monoxide detected at a location proximate to the respective wall portion 212A-212D. The images 213 of FIGS. 6A and 214 of FIG. 6B depicted with cross-hatching represent a concentration of carbon monoxide of greater than about 6 percent mole fraction detected at the location proximate to the respective wall portion 212A-212D. The areas of the respective wall portions 212A-212D depicted in white in FIGS. 6A and 6B, or the areas not having an image depicted thereon, represent a concentration of carbon monoxide of less than about 3 percent mole fraction detected at such location. As shown in FIG. 6B, the combined selective injection strategies provide that the portion of the total oxy-combustion furnace wall area, portions 212A-212D, having a region of high carbon monoxide concentration greater than 6 percent mole fraction is reduced to less than 1.5 percent of the total furnace wall area.

Figure 7:
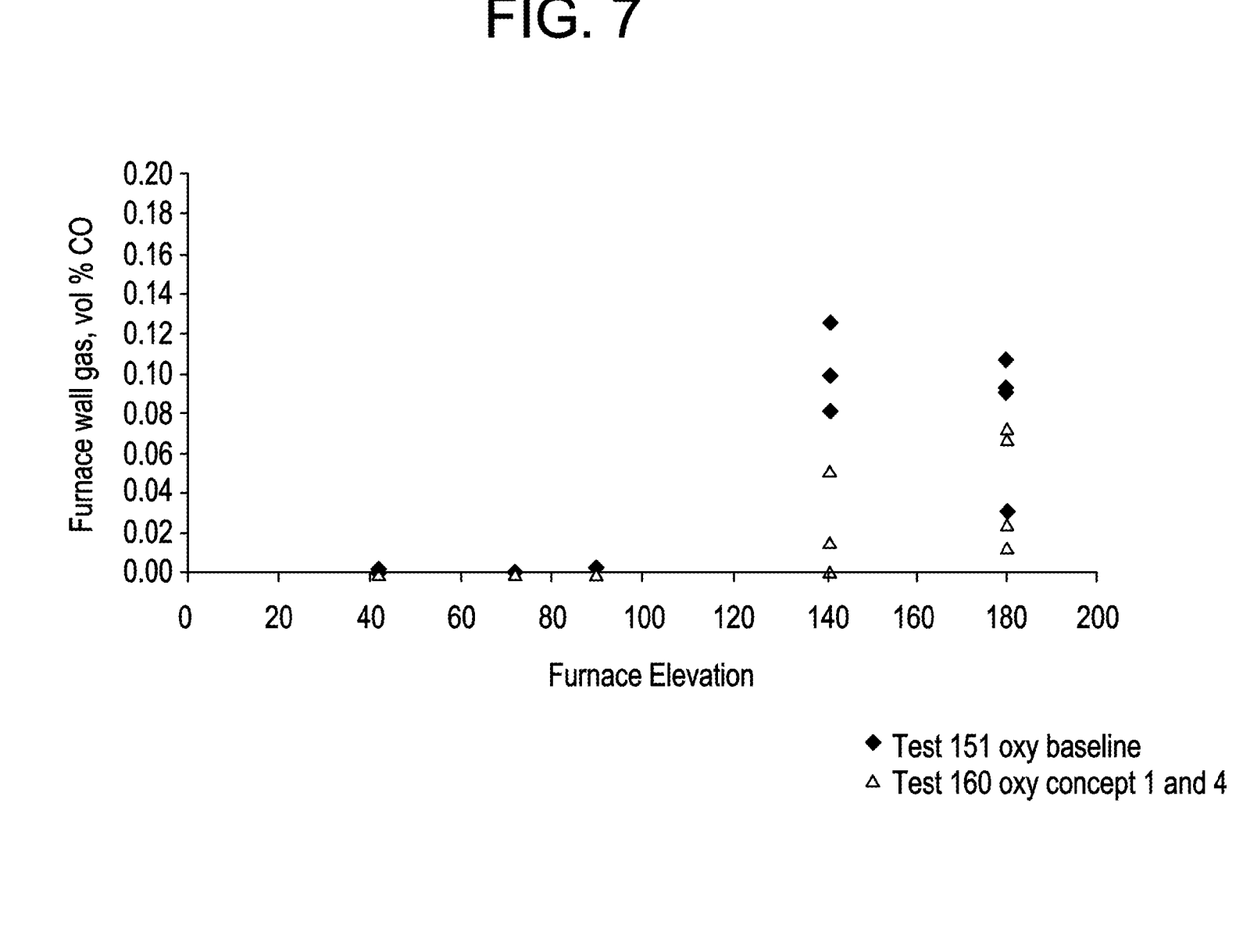

FIG. 7 provides the resulting measurements obtained using the same baseline and injection strategies shown in FIGS. 6A and 6B. The pilot testing results presented in FIG. 7 verify the CFD modeling and confirm that the enriched oxygen injection strategies create a more oxidizing, less reducing gas environment along the furnace walls relative to enrichment of the bulk secondary oxidant.

While the present invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A combustion system for an oxy-combustion furnace, the combustion system comprising:
　　a furnace having a plurality of walls and corners, the walls being disposed between the corners;
　　a plurality of windboxes one each mountable on the oxy-combustion furnace at the corners thereof, each of the windboxes defining a main firing location;
　　at least one primary inlet positioned in each of the windboxes for conveying fuel and a first oxidant into the oxy-combustion furnace tangentially to a first circle having a first diameter; and
　　at least one secondary inlet positioned in each of the main firing locations for conveying a second oxidant into the oxy-combustion furnace tangentially to a second circle having a second diameter, wherein the second diameter is greater than the first diameter; and at least one intermediate inlet disposed in a mid-wall port located approximately midway between two of the corners of the furnace for injecting a third oxidant into the oxy-combustion furnace tangentially to a third circle having a third diameter, the third diameter being greater than the second diameter.

2. An oxy-combustion system comprising:

a tangentially-fired oxy-combustion furnace including a plurality of walls and corners the walls being disposed between the corners;

a fuel source for conveying a fuel to the oxy-combustion furnace, at least one oxidant source to provide at least one oxygen stream; and a combustion system for the oxy-combustion furnace, the combustion system comprising:

a plurality of windboxes, one each mountable on the oxy-combustion furnace at the corners thereof, each of the windboxes defining a main firing location;

at least one primary inlet positioned in each of the windboxes for conveying fuel and the at least one oxygen stream into the oxy-combustion furnace tangentially to a first circle having a first diameter; and at least one secondary inlet positioned in each of the main firing locations, for conveying the at least one oxygen stream into the oxy-combustion furnace tangentially to a second circle having a second diameter, wherein the second diameter is greater than the first diameter; and at least one intermediate inlet disposed in a mid-wall port located approximately midway between two of the corners of the furnace for injecting a third oxidant into the oxy-combustion furnace, the third oxidant being injected into the oxy-combustion furnace tangentially to a third circle having a third diameter, the third diameter being greater than the second diameter.

3. The combustion system of claim 1, wherein the at least one secondary inlet is positioned in closely-coupled overfire air location.

4. The combustion system of claim 1, further comprising a heat exchanger in fluid communication downstream of the furnace to cool flue is exiting the furnace, and wherein the second oxidant includes an oxygen stream and flue gas provided upstream of the beat exchanger.

5. The combustion system of claim 4, further comprising an eductor to provide the oxygen stream and the flue gas provided upstream of the heat exchanger.

\* \* \* \* \*